United States Patent [19]

Inoue et al.

[11] Patent Number: 5,207,426
[45] Date of Patent: May 4, 1993

[54] CONTROLLER FOR A GAME MACHINE

[75] Inventors: Yoshihiro Inoue, Kyoto; Kenichiro Ashida, Amagasaki, both of Japan

[73] Assignee: Nintendo Co. Ltd., Kyoto, Japan

[21] Appl. No.: 742,678

[22] Filed: Aug. 6, 1991

[30] Foreign Application Priority Data

Aug. 9, 1990 [JP] Japan ................. 2-85019[U]

[51] Int. Cl.⁵ ............................................... A63F 9/22
[52] U.S. Cl. .......................... 273/148 B; 273/438; 340/709
[58] Field of Search ............ 273/148 B, 85, 434, 273/438, DIG. 28; 340/709

[56] References Cited

U.S. PATENT DOCUMENTS

| | | | |
|---|---|---|---|
| 4,007,443 | 2/1977 | Bromberg et al. | 340/709 X |
| 4,469,330 | 9/1984 | Asher | 273/85 G X |
| 4,504,062 | 3/1985 | Smith, III et al. | 273/85 G X |
| 4,552,360 | 11/1985 | Bromley et al. | 273/85 G |
| 4,687,200 | 8/1987 | Shirai | |
| 4,791,408 | 12/1988 | Heusinkveld | 340/365 R |
| 4,816,622 | 3/1989 | Holloway | 200/6 A |

FOREIGN PATENT DOCUMENTS

| | | |
|---|---|---|
| 748986 | 12/1988 | Japan . |
| 84/03051 | 8/1984 | PCT Int'l Appl. . |
| 781388 | 8/1957 | United Kingdom . |
| 2106324 | 4/1983 | United Kingdom . |
| 2193794 | 2/1988 | United Kingdom . |

Primary Examiner—V. Millin
Assistant Examiner—Raleigh W. Chiu
Attorney, Agent, or Firm—Nixon & Vanderhye

[57] ABSTRACT

A controller for a game machine includes a flat shaped housing. A direction designating operator is formed on the left side of upper surface of housing, and operation designating operator is formed on the right side. An operation designating operator is provided on a front side surface of the housing. The operation designating operator includes a key switch formed on the left side of a front side surface of housing, and a key switch formed on the right side. Left and right ends of the controller for a game machine are held between left and right palms to be used. While holding controller for a game machine, a player operates direction designating operator by his left thumb, operates operation designating operator by his right thumb. Further, player operates key switch by his left index finger or middle finger placed on the front side surface of housing, and operates key switch by his right index finger or middle finger. In this manner, various and many switches of the controller for a game machine of the present invention can be operated, with very little movement of hands of a player holding the controller.

37 Claims, 5 Drawing Sheets

CONTROLLER FOR A GAME MACHINE

BACKGROUND OF THE INVENTION

1. Field of the Invention

The present invention relates to a controller for a game machine and, more specifically, to a controller used by a player for operating a video game machine.

2. Description of the Background Art

A controller for a TV game machine for home use (commercially available as "Family Computer" and "Nintendo Entertainment System") which is manufactured and sold by the assignee of the present invention has been well known. This controller comprises a cross shaped key top provided on an operation surface of a housing, and a rubber contact switch provided therebelow, as disclosed in U.S. Pat. No. 4,687,200 or in Japanese Design Registration No. 748986. By this controller, four different instructions can be given to the game machine by only moving a thumb placed on the key top upward, downward, to the left and to the right. This controller can be operated easily.

However, since recent game programs have become more complicated and difficult, the number of operation switches have been increased. When the number of operation switches are increased, different switches must be simultaneously operated by plural fingers, and therefore speed of operation tends to be decreased, and mistakes in operation may occur. Such problems make the game less interesting.

Therefore, when the number of operation switches is to be increased, the design of a controller is of much importance. The following conditions must be satisfied to provide good controllability even if the number of operation switches are increased, from the view point of human engineering.

(1) It is not necessary to move one's hand as a whole to operate a switch.

(2) A switch can be depressed with minimum movement of a finger.

(3) Direction of movement of a finger is natural and in accordance with movement of the joint of one's finger.

(4) As to the index finger or middle finger which can be moved in a narrower range compared with the thumb, only one switch is allotted to one finger, and the key top for the finger is large.

(5) The controller can be fixed when held by both hands.

(6) The controller is light and compact so that it is easy to hold the controller by both hands.

(7) The controller has durable structure enough to withstand frequent and rough treatment.

Unfortunately, an ideal controller for a game machine satisfying all the conditions described above has not yet been realized.

SUMMARY OF THE INVENTION

Therefore, an object of the present invention is to provide a controller for a game machine which is quite easy to handle and enables quick and correct operation even if the number of operation switches is increased.

Another object of the present invention is to provide a controller for a game machine having simple structure and suitable for mass production.

A further object of the present invention is to provide a controller for a game machine having structure durable enough to withstand frequent and rough handling.

The controller for a game machine in accordance with the present invention is held between the left and right palms, and includes a flat shaped housing, upper surface user user operating means and side surface operating means. The housing includes an upper surface, a lower surface and a side surface spatially separating the upper and lower surfaces. The upper surface operating means is formed on the upper surface of the housing where thumb of a hand holding the housing can reach. The side surface operating means is formed on the side surface of the housing where an index finger or middle finger of the hand holding the housing can reach. The side surface operating means includes an elongate key top, switching means, and holding means; The key top is axially supported in the housing and pinatable. It is arranged such that a portion thereof is exposed along the side surface of the housing. The switch means is contained in the housing, and when it is depressed by the rotation of the key top, it outputs an electric signal. The holding means holds the switch means in the housing at a position where the switch can be depressed by the key top.

In the present invention, the upper surface operating means is formed on the upper surface of the housing where a thumb can reach, and the side surface user operating means is formed on the side surface of the housing where an index finger or middle finger can reach. Therefore, a user can operate respective operating means simply by moving the thumb and the finger without moving his hand holding the housing. In addition, each of the operating means can be operated with minimum movement of the thumb or the finger. In addition, in the present invention, the direction of depressing the upper surface operating means and the side surface operating means are the same as the direction of bending the thumb or the finger operating these means, and therefore, smooth operation is enabled. Further, in the present invention, the key top of the side surface operating means has an elongate surface and arranged along the side surface of the housing. Therefore, a wide operating range can be ensured below the index finger or the middle finger holding the side surface of the housing. Therefore, even if this operating means is operated by an index finger or the middle finger which has smaller range of movement and slow speed of operation compared with the thumb, it can be easily operated. Further, in the present invention, the switching means of the side surface operating means is held by the holding means in the housing. Therefore, it can withstand frequent and rough handling. Since the housing of the controller has a flat shape, it is light and compact and it can be easily held by both hands. Further, since the present invention has simple structure, assembly is easy and it is suitable for mass production.

As described above, the controller for a game machine in accordance with the present invention fairly satisfies the above conditions (1) to (7). The controller for a game machine in accordance with the present invention has superior controllability, it is inexpensive and durable.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
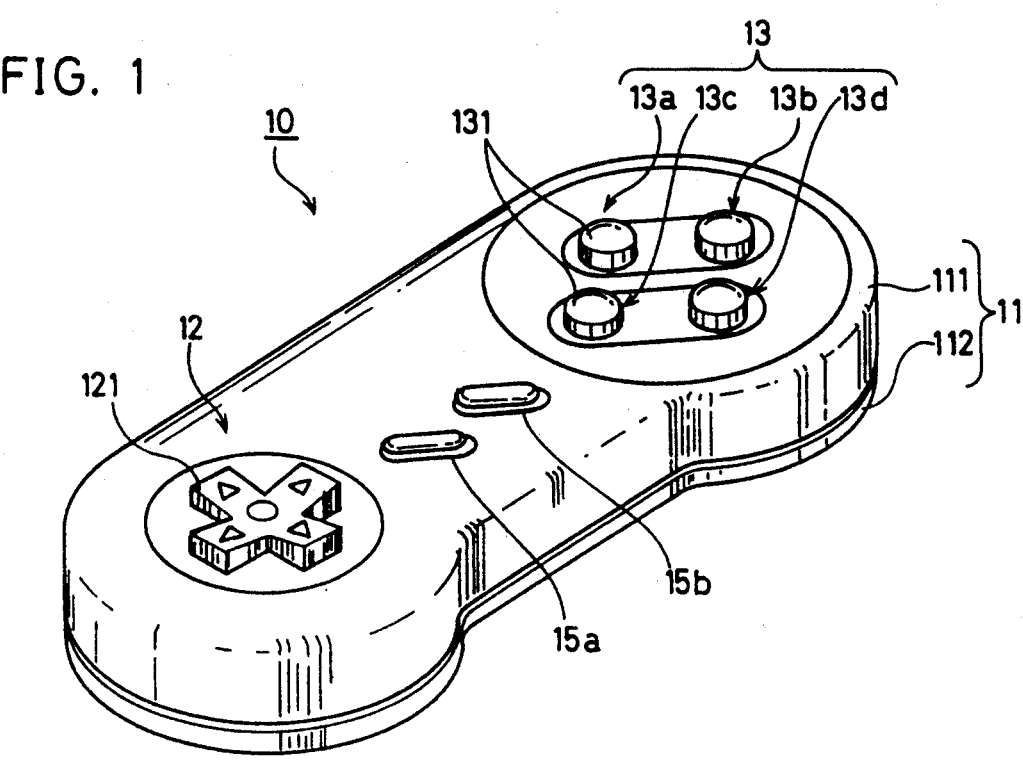
FIG. 1 is a perspective view of a controller for a game machine in accordance with one embodiment of the present invention, viewed from an upper surface.
Figure 2:
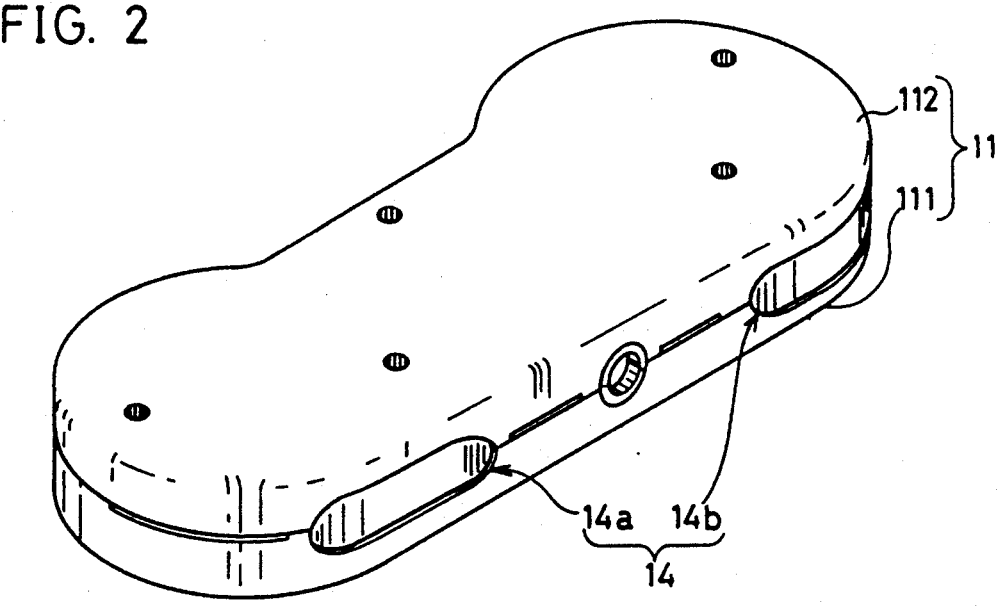
FIG. 2 is a perspective view of the controller for a game machine in accordance with one embodiment of the present invention, viewed from the lower surface.

FIGS. 1 and 2 are perspective views of the appearance of the controller for a game machine in accordance with one embodiment of the present invention. FIG. 1 shows the upper surface of the controller for a game machine, and FIG. 2 shows the lower surface.

Referring to FIGS. 1 and 2, a controller 10 for a game machine includes a housing 11. A direction designating operator (also referred to as a direction designating switch) 12 which is an example of a first upper surface operating means, and an operation designating operator (also referred to as an operation designating switch) 13 which is an example of second upper surface operating means are separately provided at the left and the right of the upper surface of housing 11. The arrangement of direction designating operator 12 and operation designating operator 13 may be reversed. At least one operation designating operator (also referred to as an operation designating switch) 14 which is an example of the side surface operating means which is the characteristic of the present invention, is provided on the side surface of housing 11 positioned in front of direction designating operator 12 or operation designating operator 13.

More preferably, a pair of (a total of two) operation designating operators 14 are provided in the left and right positions of the front side surface of the housing 11. In the figure, two operation designating operators are provided, one of which is designated by 14a and another by 14b. The operation designating operator 14 is used for designating a state of operation (for example, state of operation of a character in a video game machine) different from that of the operation designating operator 13.

Further, a select switch 15a and a start switch 15b are provided in the middle of direction designating operator 12 and operation designating operator 13 on controller 10 for the game machine.

Figure 3:
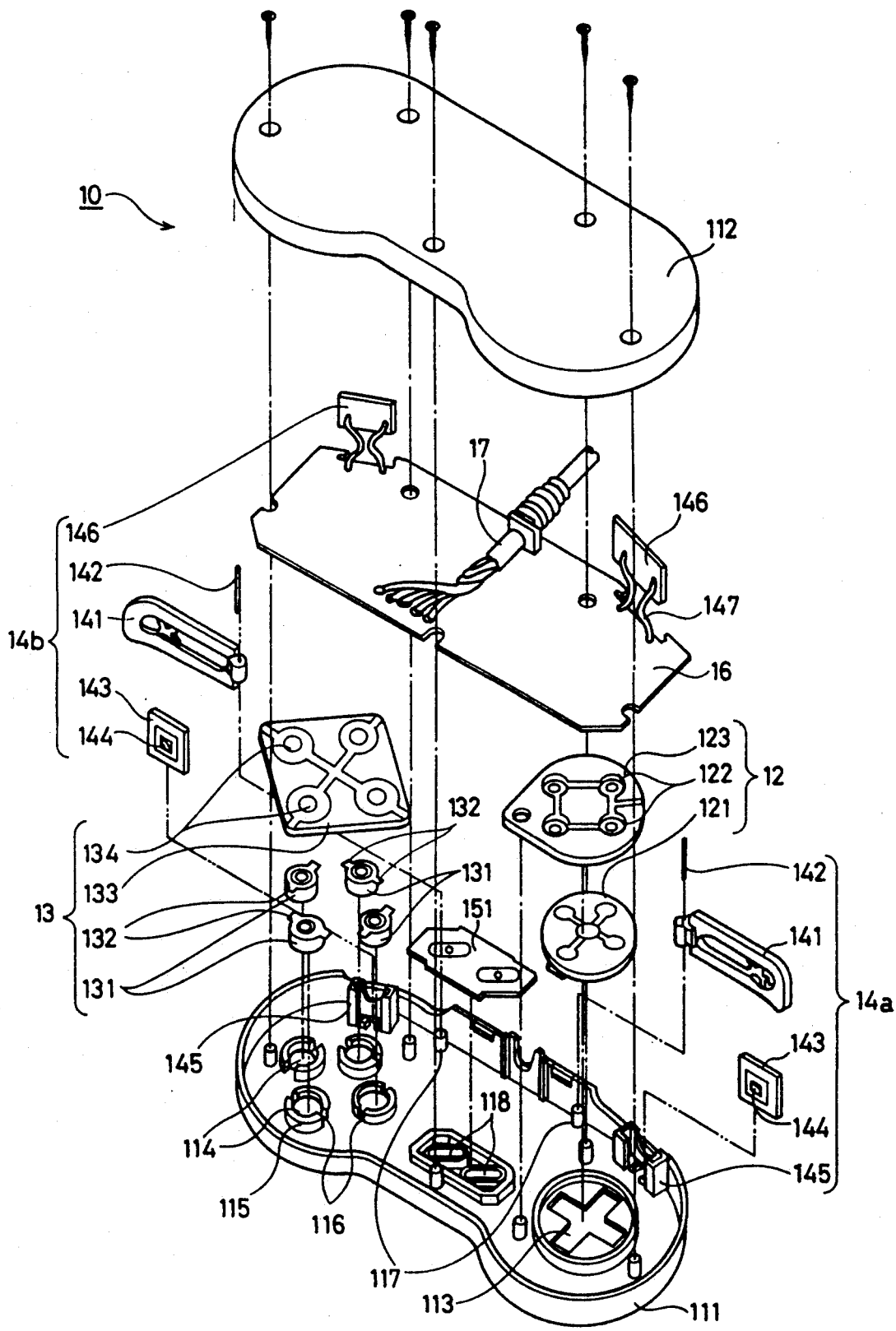
FIG. 3 is a fragmental perspective view of the controller for a game machine in accordance with one embodiment of the present invention, viewed from the lower surface.
Figures 4, 5:
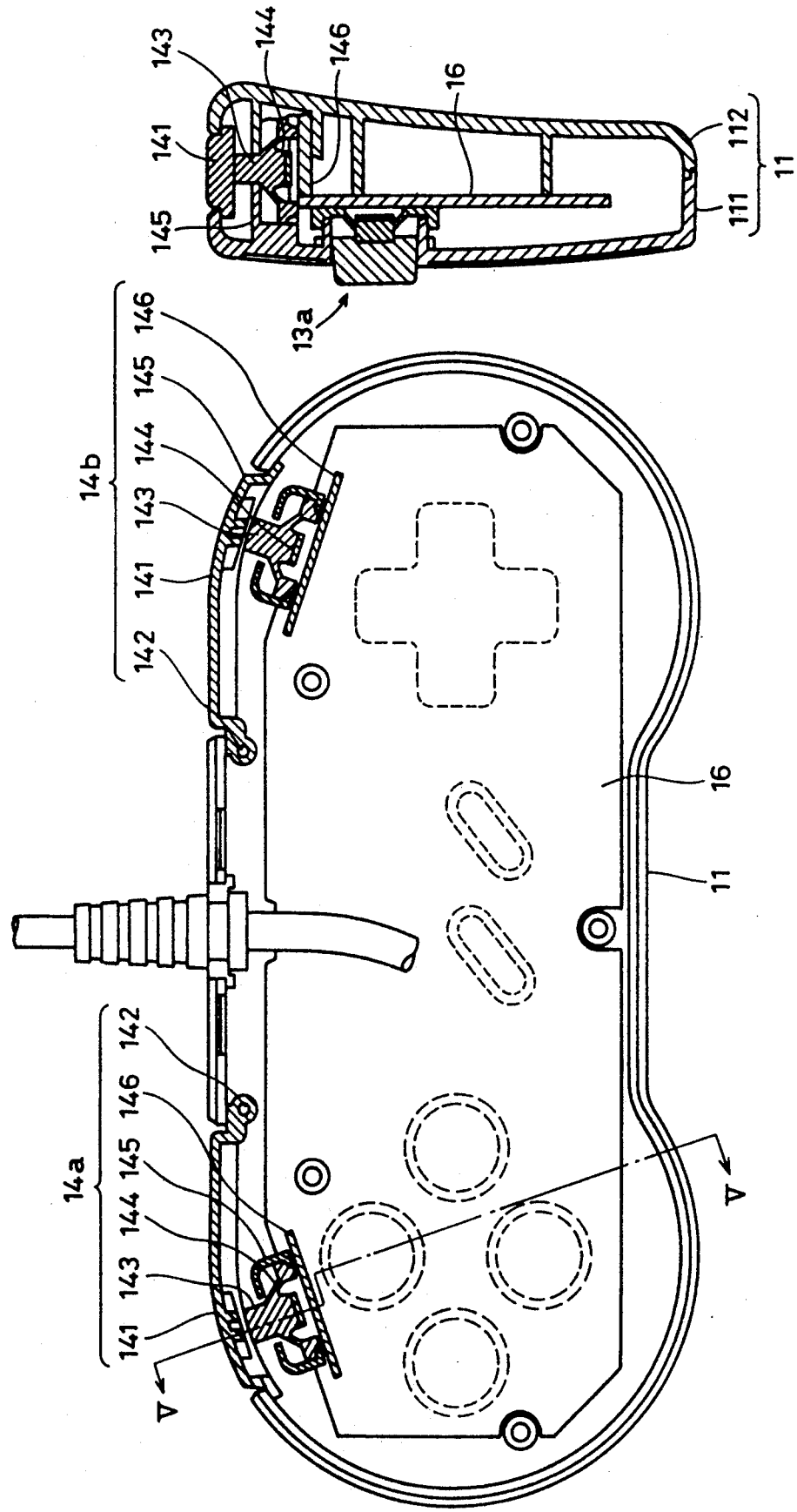
FIG. 4 is a cross sectional view of the controller for a game machine in accordance with one embodiment of the present invention.
FIG. 5 is a vertical sectional view of a main portion of the controller for a game machine in accordance with one embodiment of the present invention.

FIGS. 3 to 5 show details of the controller in accordance with one embodiment of the present invention. FIG. 3 is a fragmental perspective view of the controller viewed from the lower surface, FIG. 4 is a cross section, and FIG. 5 is a vertical sectional view of the main portion.

More detailed structure of controller 10 will be described in the following with reference to FIGS. 1 to 5. Housing 11 is divided into an upper half 111 and a lower half 112. Housing 11 has a flat longitudinal shape. Left and right side surfaces of housing 11 are rounded, so that a user can hold it easily. The central portion of the rear side surface of housing 11 has a concave in the direction of the front side surface so as to facilitate movement of thumbs operating direction designating operator 12 and operation designating operator 13. More preferably, the upper surface of housing 11 has a smooth carved convex shape, and the lower surface has a smooth carved concave shape as shown in FIG. 5, so as to be stable when it is held by both hands, and to fit players hands to facilitate operation.

A switch disclosed in, for example, U.S. Pat. No. 4,687,200 is used as direction designating operator 12. More specifically, direction designating operator 12 includes a cross shaped key top 121. A rubber contact 123 constituting four contacts 122 is arranged below key top 121. Rubber contact 123 is placed on a board 16 on which a contact circuit (not shown) is formed. When any of an upper, lower, left and right projecting portion of key top 121 is depressed, rubber contact 123 therebelow is resiliently deformed in the direction of depression of the key top 121. Consequently, contact 122 positioned below the direction of depression of key top 121 out of four contacts 122 of rubber contact 123 is brought into electrical contact with the contact circuit formed on board 16. Direction designating operator 12 having such a structure serves as a switch designating one of the upper, lower, left and right directions. A cross shaped hole 113 into which key top 121 is inserted is formed on the upper surface near the left end of the upper half 111.

Figure 7:
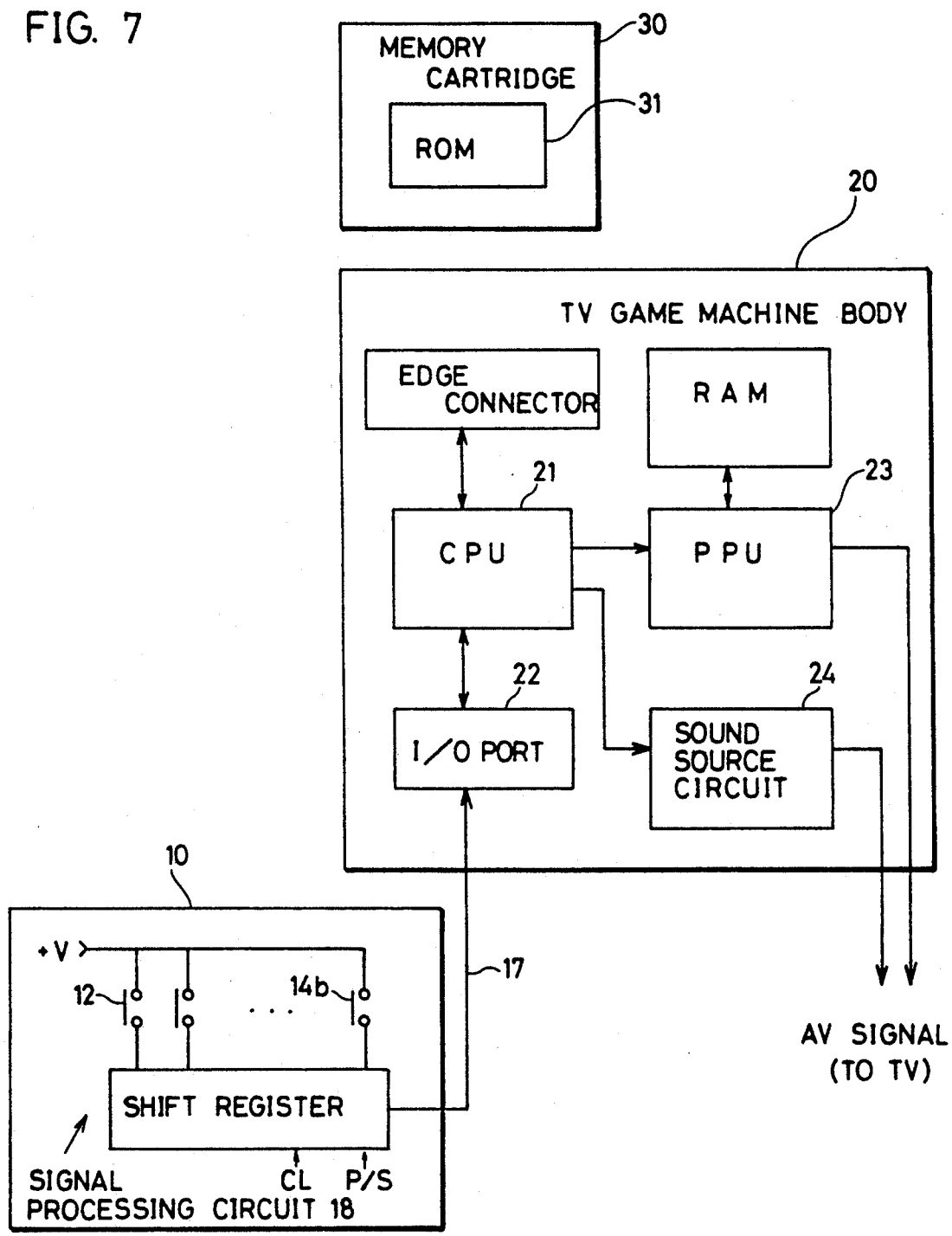
FIG. 7 is a block diagram showing one example of a structure of a game machine system to which the controller for a game machine of one embodiment of the present invention is connected.

Operation designating operator 13 includes four key switches 13a to 13d. These key switches 13a to 13d are provided at the upper surface near the right end of housing 11. Key switches 13a to 13d are positioned to be on two lines crossing with each other. The two lines may orthogonally cross each other. Each of key switches 13a to 13d has a cylindrical key top 131. A projection 132 projecting radially is formed on the outer periphery of a base portion of each key top 131. Four holes 114 into which key tops 131 are inserted are formed on the upper half 111. At the rear surface of upper half 111, a cylindrical guide projection 115 is formed around each hole 114. A groove 116 for guiding projection 132 provided on each key top 131 is formed on the side surface of each guide projection 115. Instead of such groove 116, stripe notches may be provided on inner wall of the side surface of each guide projection 115. A rubber contact 133 for resiliently holding each key top 131 is provided below each key top 131. Rubber contact 133 is formed of an elastic rubber on which four contacts 134 corresponding to the key tops 131 are integrally fixed. At portions of the board 16 positioned below each key top 131, a contact circuit (not shown) corresponding to each contact 134 of the rubber contact 133 is formed. A cord 17 for transmitting states of operations of various switches 12, 13, 14, 15a and 15b (see FIG. 7) to a processing unit (CPU) is connected to the board 16, and a signal processing circuit 18 shown in FIG. 7 is provided on the board 16.

Designations given by key switches 13a to 13d to the body of the game machine (not shown) in response to operations thereof are determined by the game program. Contents of designation of key switches 13a to 13d are not fixed on the side of the controller. Therefore, controller 10 treats key switches 13a to 13d as switches designating operation A to operation D, the function of which is not specified. Reference characters A to D are allotted to surfaces of key tops 131 of key switches 13a to 13d or to positions of the upper surface of upper half 111 corresponding to key switches 13a to 13d.

Operation designating operators 14a and 14b include key tops 141. Each key top 141 has a longitudinal shape extending along the side surface of housing 11, and its width is narrower than that of the side surface of housing 11. One end portion of each key top 141 (near the center of housing 11) is axially supported by an axis 142 to be a fixed end. Each axis 142 is inserted and held in an axis receiving portion 117 formed on the rear surface of upper half 111 of housing 11. The other end of each key top 141 is a free end. Therefore, the free end of each key top 141 can pivot about the axis 142. A portion near the free end of each key top 141 is rounded, so that it matches with the shape of the side surface of housing 11. Two sets of rubber contacts 143 are positioned opposing inner side surface near the free end of each key top in housing 11. The bottom surface of each rubber contact 143 provides a cavity as shown in FIGS. 4 and 5, and a contact 144 is formed on the ceiling surface of the cavity. Each rubber contact 143 is contained and held in a corresponding holding member 145. Each holding member 145 is arranged at a position opposing an inner side surface near the free end of each key top 141, in housing 11. Each holding member 145 may be prepared as a member separate from housing 11. However, preferably, it is integrally formed on the rear surface of upper half 111 of housing 11, as in the present embodiment. Each holding member 145 holds each rubber contact 143, and serves as a stopper for limiting angle of rotation of each key top 141 in a prescribed range. As shown in FIGS. 3 to 5, each holding member 145 is formed as a frame shaped projection having a groove to which the rubber contact 143 is inserted. A board (auxiliary board) 146 is arranged at a position opposing each rubber contact 143 and holding member 145. Each board 146 is inserted to notches formed near left and right corners of the board 16, for example, and fixed to be vertical to the board 16. Contact circuits (not shown) corresponding to contacts 144 of the rubber contacts 143 are formed on the surface of board 146. When each key top 141 is pivoted, rubber contact 143 is resiliently deformed, whereby each contact is brought into contact in parallel to the contact circuit on each board 146. The contact circuit formed on each board 146 is connected to a portion of a circuit pattern formed on board 16 through a lead 147.

Steps for assembling controller 10 for a game machine in accordance with the present invention will be described. First, as shown in FIG. 3, upper half 111 is placed with its rear surface facing upward. Then, from the rear surface side of upper half 111, key top 121 facing downward is inserted to hole 113. Thereafter, rubber contact 123 is placed on the bottom surface of key top 121. Thereafter, four key tops 131 facing downward are inserted to four holes 114 of upper half 111. Each key top 131 is positioned such that projection 132 provided on each key top 131 fits a groove formed on each guide projection 115. Thus insertion of each key top 131 to each hole 114 is facilitated. Thereafter, rubber contact 133 facing downward is placed on the bottom surface of each key top 131. Thereafter, each rubber contact 143 is inserted to each holding member 145. Then one end of each axis 12 is inserted to each axis receiving portion 117. Each axis 142 is inserted to a hole formed at a fixed end of each key top 141. Consequently, the fixed end of each key top 141 is axially supported by axis 142. Further, rubber contact 151 including select switch 15a and start switch 15b formed integrally is inserted into hole 118 of upper half 111, which rubber contact facing downward. Thereafter, board 16 is placed on rubber contacts 123 and 133, with each board 146 positioned opposing each holding member 145. Thereafter, lower half 112 is put on upper half 111, and lower half 112 is fixed to upper half 111 by means of screws.

As described above, in the present embodiment, four key switches 13a to 13d included in operation designating operator 13 are arranged in four directions which are crossing or orthogonally crossing. The key switches 13a to 13d can be used as direction designating switches designating upper, lower, left or right direction, based on program processing. In this case, controller 10 for a game machine can be used for a game which requires two different systems of direction designating operators. For example, in a game for controlling a tank, upper or lower projecting portion of the key top 121 of direction designating operator 12 may be depressed to designate forward or rearward rotation of left caterpillar of the tank. Key switches 13a or 13d of operation designating operator 13 may be depressed to designate forward or rearward rotation of right caterpillar of the tank. In this case, when the upper projection of key top 121 and key switch 13a are depressed, the tank moves forward (advances). When the lower projection of key top 121 and key switch 13d are depressed, the tank moves rearward. When upper projecting portion of the key top 121 and key switch 13d are depressed, the tank turns to the left, and when lower projection of key top 121 and key switch 13a are depressed, the tank turns to the right. In such a tank game, operation designating operator 14 may be used to designate emission of a missile or firing of a gun. In a game requiring only one system of direction designating operator, when operation designating operator 13 is used as the direction designating operator and direction designating operator 12 is used as operation designating operator by preparing an appropriate program, a controller for a game machine which is convenient for a left handed player can be provided.

Controller 10 for a game machine in the above described embodiment includes two key switches 14a and 14b provided on left and right sides of front side surface of housing 11, as operation designating operators 14. Alternatively, only one key switch may be provided on the right side or left side of front side surface of housing 11. Further, by making housing 11 thick, two key switches may be arranged juxtaposed on the right side or left side of the front side surface of housing 11. Two key switches may be provided on each of the right and left sides of the front side surface of housing 11 (four switches in total). In that case, the key switches are operated by the index finger and middle finger of a player holding housing 11. Key top 141 of key switch 14a and key top 141 of key switch 14b may be formed as a coupled integral one key top, and the central portion of the key top may be axially supported by axis 142.

Methods of using controller 10 for a game machine of the above described embodiment, and effect thereof will be described in detail.

Figure 6:
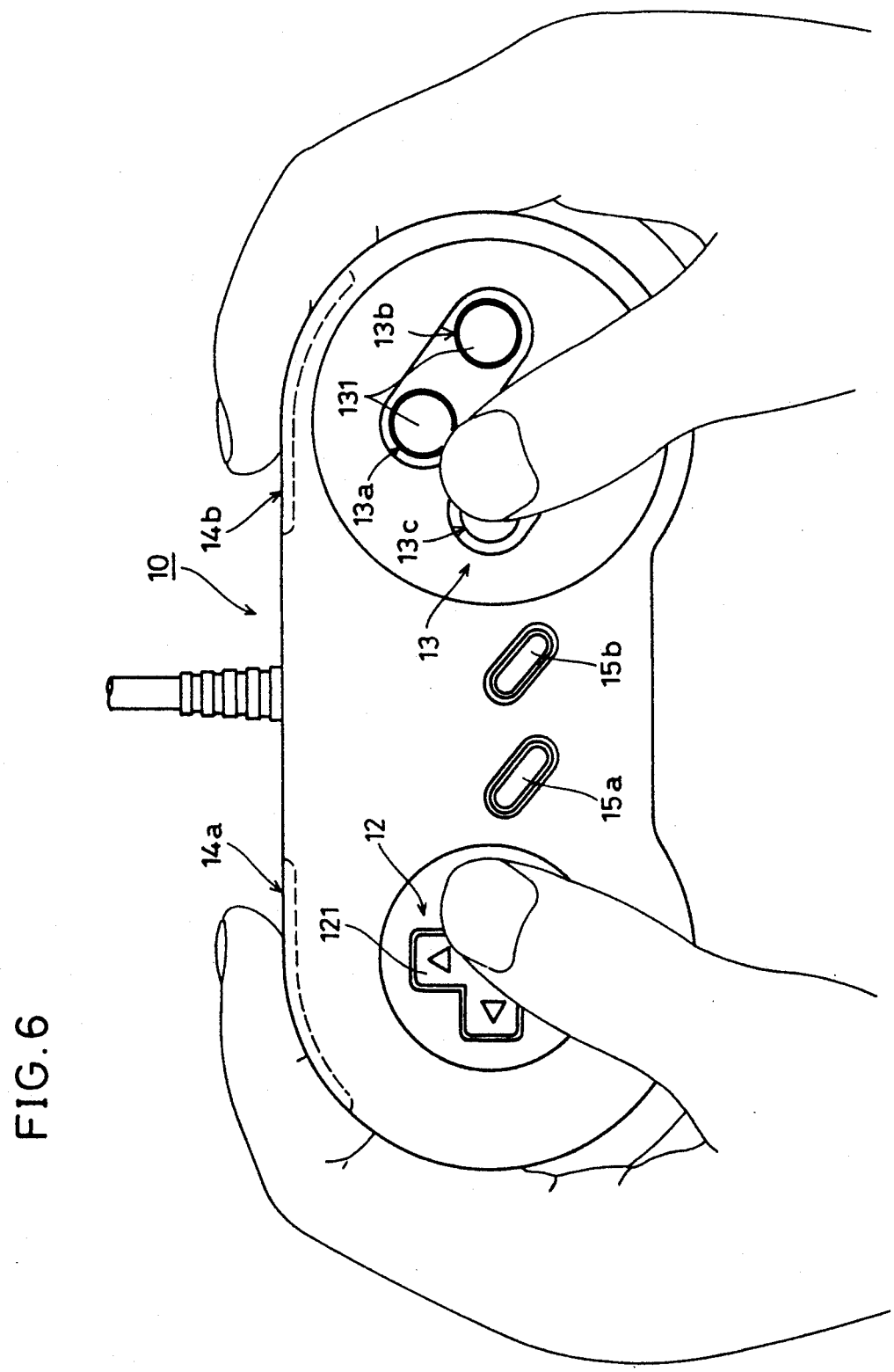
FIG. 6 illustrates state of operation of the controller for a game machine in accordance with one embodiment of the present invention.

FIG. 6 shows the state typical of controller 10 for a game machine when in use. FIG. 7 is a block diagram showing an example of a game machine system structure to which controller 10 for a game machine of the present embodiment is connected.

Controller 10 for a game machine of the present embodiment is used as shown in FIG. 6. More specifically, a player holds left and right ends of housing 11 with his left and right palms. In order to hold housing 11 stably, the player places his index fingers or middle fingers along the front side surface of housing 11. In this state, the player moves or changes inclination of his left thumb to depress any of upper, lower, left and right four projecting portions of the cross shaped key top 121. Thus direction of movement of a character or cursor displayed on a game screen (not shown) is designated. The player depresses key top of any of four key tops 13a to 13d while moving his right thumb. Thus a prescribed state of operation in the game is designated. Further, the player depresses key tops 141 of key switches 14a and 14b by his left and right index fingers or middle fingers. When a key top 141 is depressed by the inner portion of the index finger or middle finger, free end of key top 141 is depressed and pivoted about the axially supported fixed end. Thus rubber contact 143 in housing 11 is resiliently deformed, and contact circuit formed on board 146 is short-circuited. Accordingly, an electric signal is provided from the contact circuit.

Referring to FIG. 7, a signal processing circuit 18 includes a shift register capable of parallel input and serial output. When a parallel write signal is applied from a microprocessor (CPU) 21 of game machine body 20, signal processing circuit 18 reads depression signals from direction designating operator 12, key switches 13a to 13d and 14a to 14b as parallel inputs, and stores and holds the same in the shift register. Then, when a serial read signal is applied from microprocessor 21 of game machine body 20, the signal processing circuit 18 serially outputs data stored in shift register in synchronization with a clock signal CL. Outputs from the shift register are applied to an I/O port 22 and loaded in I/O port 22. CPU 21 determines data indicating states of operation of controller 10 for a game machine loaded in I/O port 22 in accordance with a program set in a memory (ROM) 31 included in a game cartridge 30, and executes game processes in accordance with the result of such data indicating state determination. The game processing includes image processing for moving or changing a character displayed on a game screen, for example. Such image processing is executed by an image processing processor (PPU) 23 under control of CPU 21 in accordance with a program set in memory 31. At this time, a sound source circuit 24 generates analog signals for generating background music or sound effect under control of CPU 21 in accordance with the program set in memory 31.

A program may be adapted to allow a player to selectively set what function of designation should be allotted to key switches 13a to 13d included in operation designating operator 13 and to key switches 14a and 14b included in operation designating operator 14, at the start of the game.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A controller for a game machine, said controller being held in use by a use between left and right palms, comprising:
   a flat-shaped, elongate housing having an upper surface, a lower surface and a side surface spatially separating the upper and lower surfaces;
   upper surface user operating means for generating electrical signals formed at a position on the upper surface of said housing reachable by a thumb of a hand holding the housing; and
   side surface user operating means for generating electrical signals formed at a position on the side surface of said housing reachable by an index finger or a middle finger of a hand holding the housing;
   wherein said side surface user operating means includes;
   an elongate key member having one end supported and pivotable in said housing approximately a the center of said housing in the longitudinal direction and another movable end extending longitudinally along the side surface of the housing toward an end portion of said housing and positioned to have the movable end of the key member exposed,
   switch means contained in said housing for outputting an electrical signal when depressed by pivoting of said key member, and
   holding means for holding said switch means in said housing at a position where said switch means can be depressed by said key member.

2. A controller for a game machine according to claim 1, wherein
   said switch means includes;
   a rubber contact which is resiliently deformed in a depressed direction when depressed by pivoting of said key member and held by said holding means, and
   a first member provided at position facing said rubber contact, having a contact circuit which provides an electric signal upon contact with said rubber contact.

3. A controller for a game machine according to claim 2, further comprising:
   a second member contained in said housing for providing an electric signal by an operation of said upper surface user operating means, wherein
   said first member is fixedly engaged with said second member.

4. A controller for a game machine according to claim 2, wherein
   said holding means is formed on a rear side surface of said housing for positioning and holding said rubber contact inserted therethrough and for limiting movement of said key member.

5. A controller for a game machine according to claim 4, wherein
   said holding means is formed integrally with said housing.

6. A controller for a game machine according to claim 1, wherein
   said side surface user operating means includes a left-hand elongate key member and a right-hand elongate key member arranged symmetrically on left and right portions of the side surface of said housing.

7. A controller for a game machine according to claim 6, wherein
said left-hand elongate key member extends to a position where it can be depressed by the index finger or middle finger of the left hand holding said housing, and
said right-hand elongate key member extends to a position where it can be depressed by the index finger or the middle finger of the right hand holding said housing.

8. A controller for a game machine according to claim 1, wherein
said upper surface user operating means includes first upper surface operating means provided at a position where, in use, a thumb of one of the hands holding said housing can reach.

9. A controller for a game machine according to claim 8, wherein said controller is used to control a game having characters and wherein
said first upper surface operating means designates direction of movement of a character of the game, when it is operated.

10. A controller for a game machine according to claim 8, wherein
said upper surface user operating means further includes second upper surface operating means provided at a position where, in use, a the of the other one of the hands holding said housing can reach.

11. A controller for a game machine according to claim 10, wherein said controller is used to control a game having characters and wherein
said first upper surface operating means gives a first operation designation of a character for the game, when it is operated, and
said second upper surface operating means gives a second operation designation of a character for the game, when it is operated.

12. A controller for a game machine according to claim 11, wherein said controller is used to control a game having characters and wherein
said first upper surface operating means gives designation of direction of movement of a character for the game when it is operated, and
said second upper surface operating means gives designation of a change of state of operation other than direction of movement of character for the game, when it is operated.

13. A controller for a game machine according to claim 12, wherein
said second upper surface operating means includes four operation switches.

14. A controller for a game machine in accordance with claim 13, wherein
said for operation switches includes four key tops arranged in four directions orthogonally crossing with each other on the upper surface of said housing, four rubber contacts provided below the key tops, which are depressed by corresponding key tops to be resiliently deformed in the direction of depression, and four contact circuits provided at positions facing the rubber contacts and each of which provides, when a corresponding rubber contact is depressed an electric signal by contact with said rubber contact.

15. A controller for a game machine according to claim 14, wherein
said four contact circuits are formed on the same board.

16. A controller for a game machine according to claim 15, wherein
a contact circuit for providing an electric signal in response to an operation of said first upper surface operating means is formed on said board.

17. A controller for a game machine according to claim 11, wherein
said first upper surface operating means, when operated, directs a first direction of movement of a character for the game, and
said second upper surface operating means, when operated, directs a second direction of movement of a character for the game.

18. A controller for a game machine according to claim 1, wherein a rear side surface of said housing is concave in shape.

19. A controller for a game machine according to claim 1, wherein said upper surface of said housing is convex in shape.

20. A controller for a game machine according to claim 1, wherein said lower surface of said housing is concave in shape.

21. A controller for a game machine according to claim 1, wherein said side surface of said housing is rounded.

22. A controller for a game machine, said controller being held in use by a user between left and right palms, comprising:
a flat-shaped housing having an upper surface, a lower surface and a side surface spatially separating the upper and lower surfaces;
upper surface user operating means for generating electrical signals and formed at a position on the upper surface of said housing reachable, in use, by a thumb of a hand holding the housing; and
side surface user operating means for generating electrical signals formed at a position on the side surface of said housing reachable, in use, by an index finger or a middle finger of the hand holding the housing, wherein said side surface user operating means includes:
an elongate key member axially supported at one end and pivotal in said housing and positioned to have a portion thereof exposed along the side surface of said housing,
switch means contained in said housing of generating an electrical signal when depressed by pivotally moving said key member, and
holding mean or holding said switch means in said housing at a position where said switch mean can be depressed by said key member.

23. A controller for a game machine according to claim 22, wherein said switch means includes:
a rubber contact supported by said holding means and resiliently deformable when depressed by pivotal movement of said key member, and
a first member provided adjacent to said rubber contact and having a contact circuit which provides an electric signal upon contact with said rubber contact; and
said holding means being formed on a rear side surface of the upper surface of said housing as a frame for positioning and holding said rubber contact inserted therethrough and for limiting pivotal movement of said key member.

24. A controller for a game machine according to claim 23, further comprising:

a second member contained in said housing for providing an electric signal by an operation of said upper surface user operating means, wherein said first member is fixedly engaged with said second member.

25. A controller for a game machine according to claim 22, wherein said side surface user operating means includes:

left-hand and right-hand elongated key members arranged symmetrically on the side surfaces of said housing.

26. A controller for a game machine according to claim 22, wherein said upper surface user operating means includes:

first upper surface user operating means provided at a position reachable, in use, by a thumb of one of the hands holding said housing, and second upper surface user operating means provided at a position reachable, in use, by a thumb of the other one of the hands holding said housing.

27. A controller for a game machine, said controlled being held in sue by a user between left and right palms, comprising:

a flat-shaped housing having an upper surface, a lower surface and a rounded side surface spatially separating the upper and lower surfaces;

upper surface user operating means for generating electrical signals and formed at a position on the upper surface of said housing reachable, in use, by a thumb of a hand holding the housing; and side surface user operating means for generating electrical signals and formed at a position on the side surface of said housing reachable, in use by an index finger or a middle finger of the hand holding the housing, wherein said side surface user operating means includes:

an elongate key member axially supported and rotatable in said housing and positioned to have a portion exposed along the side surface of said housing, switch means contained in said housing for outputting an electrical signal when depressed by pivoting of said key member, and holding means formed integrally in said housing for holding said switch means at a position where said switch means can be depressed by said key member; and said switch means includes:

a rubber contact held by said holding means and resiliently deformable when depressed by pivotal movement of said key member, and a first member provided adjacent to said rubber contact and having a contact circuit which provides an electric signal upon contact with said rubber contact.

28. A controller for a game machine according to claim 27, wherein said holding means, formed on a rear surface side of the upper surface of said housing, positions and holds said rubber contact inserted therethrough and limits movement of said key member.

29. A controller for a game machine according to claim 27, wherein said side surface user operating means includes operating means for a left hand and operating means for a right hand arranged symmetrically on left and right portions of the side surface of said housing.

30. A controller for a game machine according to claim 27, wherein a rear side surface of said housing is concave in shape.

31. A controller for a game machine according to claim 27, wherein said upper surface of said housing is convex in shaped 32. A controller for a game machine according to claim 27, wherein said lower surface is concave in shape.

33. A controller for a game machine, said controller being held, in use, by a user between left and right palms, comprising:

a flat-shaped housing having an upper surface, as a lower surface and a side surface spatially separating the upper and lower surfaces;

upper surface user operating means for generating electrical signals formed at a position on the upper surface of said housing where, in use, a thumb of a hand holding the housing can reach; and side surface user operating means for generating electrical signals formed at a position on the side surface of said housing where, in use, an index finger or a middle finger of the hand holding the housing can reach, wherein said side surface user operating means includes an operating member for a left hand and an operating member for a right hand arranged symmetrically on left and right portions of the side surface of said housing, each of the side surface user operating members including an elongate key member axially supported nd pivotal in said housing and positioned to have a portion thereof exposed along the side surface of said housing.

34. A controller or a game machine according to claim 33, said side surface user operating means further comprising:

switch means contained in said housing for outputting an electric signal when depressed by pivoting of said key member, and holding means formed integrally in said housing for holding said switch means at position where said switch means can be depressed by said key member.

35. A controller for a game machine according to claim 34, wherein said switch means includes:

a rubber contact held by said holding means and resiliently deformable when depressed by pivoting said key member, and a first board provided at a position facing said rubber contact having a contact circuit which provides an electric signal upon contact with said rubber contact when said rubber contact is depressed.

36. A controller of a game machine according to claim 35, further comprising:

a second board contained in said housing for providing an electric signal upon operation of said upper surface user operating means, wherein p1 said first board is engageable with said second board.

37. A controller or a game machine according to claim 35, wherein said holding means, formed on rear surface side of the upper surface of said housing, positions and holds said rubber contact inserted therethrough and limits movement of said key member.

* * * * *